United States Patent
Schmidt et al.

(10) Patent No.: US 8,405,728 B2
(45) Date of Patent: Mar. 26, 2013

(54) TERMINAL SHARING ARRANGEMENT FOR PROVIDING A DIAGNOSTIC FUNCTION

(75) Inventors: Robert Warren Schmidt, Carmel, IN (US); Matthew Robert Lamb, Westfield, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1338 days.

(21) Appl. No.: 11/659,607

(22) PCT Filed: Aug. 17, 2004

(86) PCT No.: PCT/US2004/026717
§ 371 (c)(1),
(2), (4) Date: Feb. 6, 2007

(87) PCT Pub. No.: WO2006/022720
PCT Pub. Date: Mar. 2, 2006

(65) Prior Publication Data
US 2007/0291122 A1 Dec. 20, 2007

(51) Int. Cl.
*H04N 17/02* (2006.01)
*H04R 29/00* (2006.01)
(52) U.S. Cl. .................................. 348/189; 381/58
(58) Field of Classification Search .................. 348/180, 348/189, 738, 843; 381/56, 58–60, 73.1; 704/270; 702/81, 117, 118, 120, 122
See application file for complete search history.

(56) References Cited

U.S. PATENT DOCUMENTS

| | | | | |
|---|---|---|---|---|
| 3,067,297 A * | 12/1962 | Fink | | 381/1 |
| 4,374,435 A * | 2/1983 | Lach et al. | | 370/241 |
| 4,682,246 A * | 7/1987 | Efron et al. | | 386/263 |
| 5,414,417 A * | 5/1995 | Heo | | 340/4.4 |
| 5,548,595 A * | 8/1996 | Hirayasu | | 714/708 |
| 6,115,476 A * | 9/2000 | O'Conner et al. | | 381/103 |
| 7,120,256 B2 * | 10/2006 | Grancea et al. | | 381/55 |
| 2003/0235311 A1 * | 12/2003 | Grancea et al. | | 381/58 |

FOREIGN PATENT DOCUMENTS

| | | |
|---|---|---|
| EP | 1439719 | 7/2004 |
| GB | 2231472 | 11/1990 |
| JP | 2001-1320741 | 11/2001 |

OTHER PUBLICATIONS

Patent Abstracts of Japan, vol. 2002, No. 03, Apr. 3, 2002, & JP 2001-320741 (Fuji Photo Film Co. Ltd.), Nov. 16, 2001.
Search Report Dated Apr. 27, 2005.

* cited by examiner

*Primary Examiner* — Victor Kostak
(74) *Attorney, Agent, or Firm* — Robert D. Shedd; Reitseng Lin

(57) ABSTRACT

A terminal sharing arrangement allows output terminals of an apparatus such as a television signal receiver or other device to be used for both outputting signals such as audio signals, and providing a diagnostic function. According to an exemplary embodiment, the apparatus includes a first terminal operative to output a first output signal during a first mode, and to receive a first diagnostic signal during a second mode. A second terminal is operative to output a second output signal during the first mode, and to output a second diagnostic signal during the second mode.

15 Claims, 5 Drawing Sheets

TERMINAL SHARING ARRANGEMENT FOR PROVIDING A DIAGNOSTIC FUNCTION

This application claims the benefit, under 35 U.S.C. §365 of International Application PCT/US2004/026717, filed Aug. 17, 2004, which was published in accordance with PCT Article 21(2) on Mar. 2, 2006 in English.

BACKGROUND OF THE INVENTION

1. Field of the Invention

The present invention generally relates to a technique for providing a diagnostic function for an apparatus such as a television signal receiver, and more particularly, to a terminal sharing arrangement that enables output terminals of an apparatus to be used for outputting signals such as audio signals, and also for providing a diagnostic function.

2. Background Information

Diagnostic information is often needed from certain apparatuses such as television signal receivers or other devices in order to investigate and/or analyze the cause and/or nature of a condition and/or problem associated with an apparatus. For example, diagnostic information may be used by a technician to debug hardware and/or software issues related to an apparatus during a field service call. Diagnostic information may also be used for other purposes, such as to aid in software development for an apparatus. Accordingly, there is a need for a means by which diagnostic information can be readily obtained from an apparatus.

One technique for enabling diagnostic information to be readily obtained from an apparatus is to provide one or more dedicated connector terminals through which the diagnostic information may be provided to an external device, such as a computer. This approach, however, may not be desirable since the addition of one or more dedicated connector terminals to an apparatus may not be feasible for various reasons such as cost, appearance, security, etc.

Accordingly, there is a need for a technique for enabling diagnostic information to be obtained from an apparatus such as a television signal receiver that avoids the foregoing problems, and thereby is capable of providing diagnostic information without using one or more dedicated connector terminals. The present invention addresses these and/or other issues.

SUMMARY OF THE INVENTION

In accordance with an aspect of the present invention, an apparatus having a diagnostic function is disclosed. According to an exemplary embodiment, the apparatus comprises first terminal means for outputting a first output signal during a first mode, and for receiving a first diagnostic signal during a second mode. Second terminal means is provided for outputting a second output signal during the first mode, and for outputting a second diagnostic signal during the second mode.

In accordance with another aspect of the present invention, a method for providing a diagnostic function of an apparatus is disclosed. According to an exemplary embodiment, the method comprises steps of using a first terminal of the apparatus to output a first output signal during a first mode, and to receive a first diagnostic signal during a second mode, and using a second terminal of the apparatus to output a second output signal during the first mode, and to output a second diagnostic signal during the second mode.

In accordance with yet another aspect of the present invention, a television signal receiver is disclosed. According to an exemplary embodiment, the television signal receiver comprises a first terminal operative to output a first output signal during a first mode, and to receive a first diagnostic signal during a second mode. A second terminal is operative to output a second output signal during the first mode, and to output a second diagnostic signal during the second mode.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
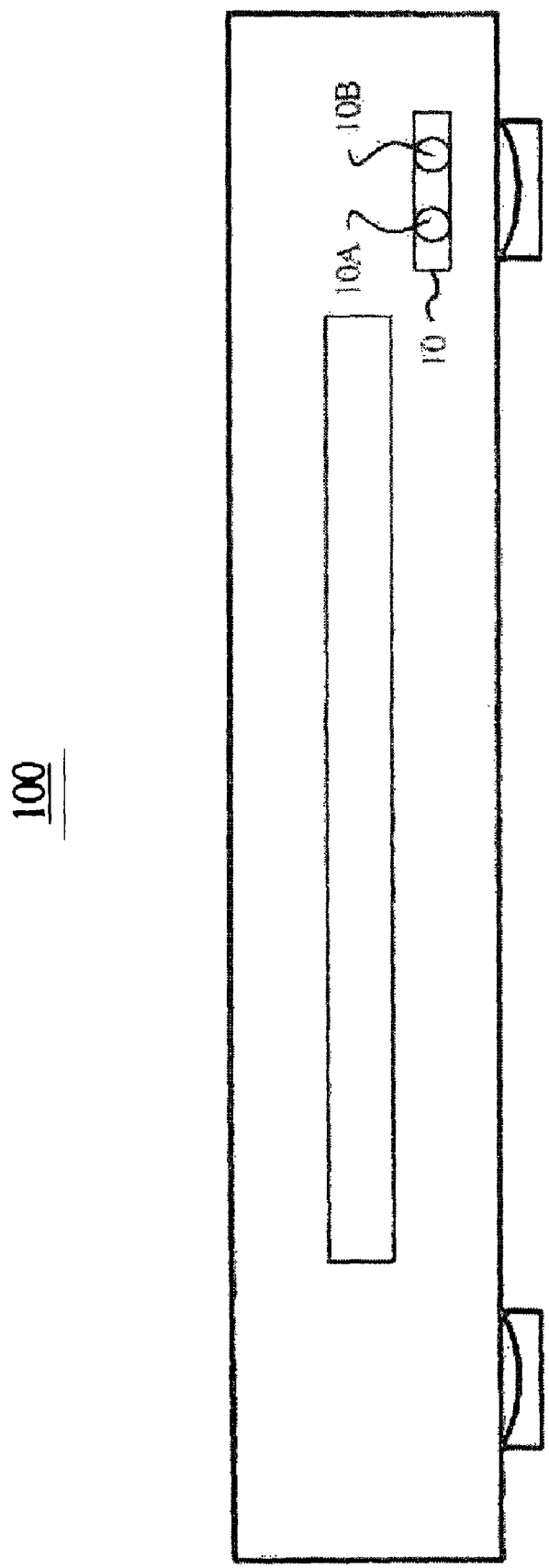
FIG. 1 is a diagram of an exemplary apparatus suitable for implementing the present invention.

Referring now to the drawings, and more particularly to FIG. 1, a diagram of an exemplary apparatus 100 suitable for implementing the present invention is shown. As shown in FIG. 1, apparatus 100 comprises output means such as audio output terminal 10 that includes first and second terminal means such as first and second terminals 10A and 10B. According to an exemplary embodiment, first and second terminals 10A and 10B represent audio output jacks of apparatus 100 that are used to output audio signals during a first mode of operation (i.e., normal mode), and to provide a diagnostic function of apparatus 100 during a second mode of operation (i.e., diagnostic mode). Also, according to an exemplary embodiment, apparatus 100 of FIG. 1 is embodied as a set-top box such as a set-top box capable of receiving and processing television signals, but may be embodied as any device or apparatus that includes a diagnostic function, regardless of whether it includes an integrated display device.

Figure 2:
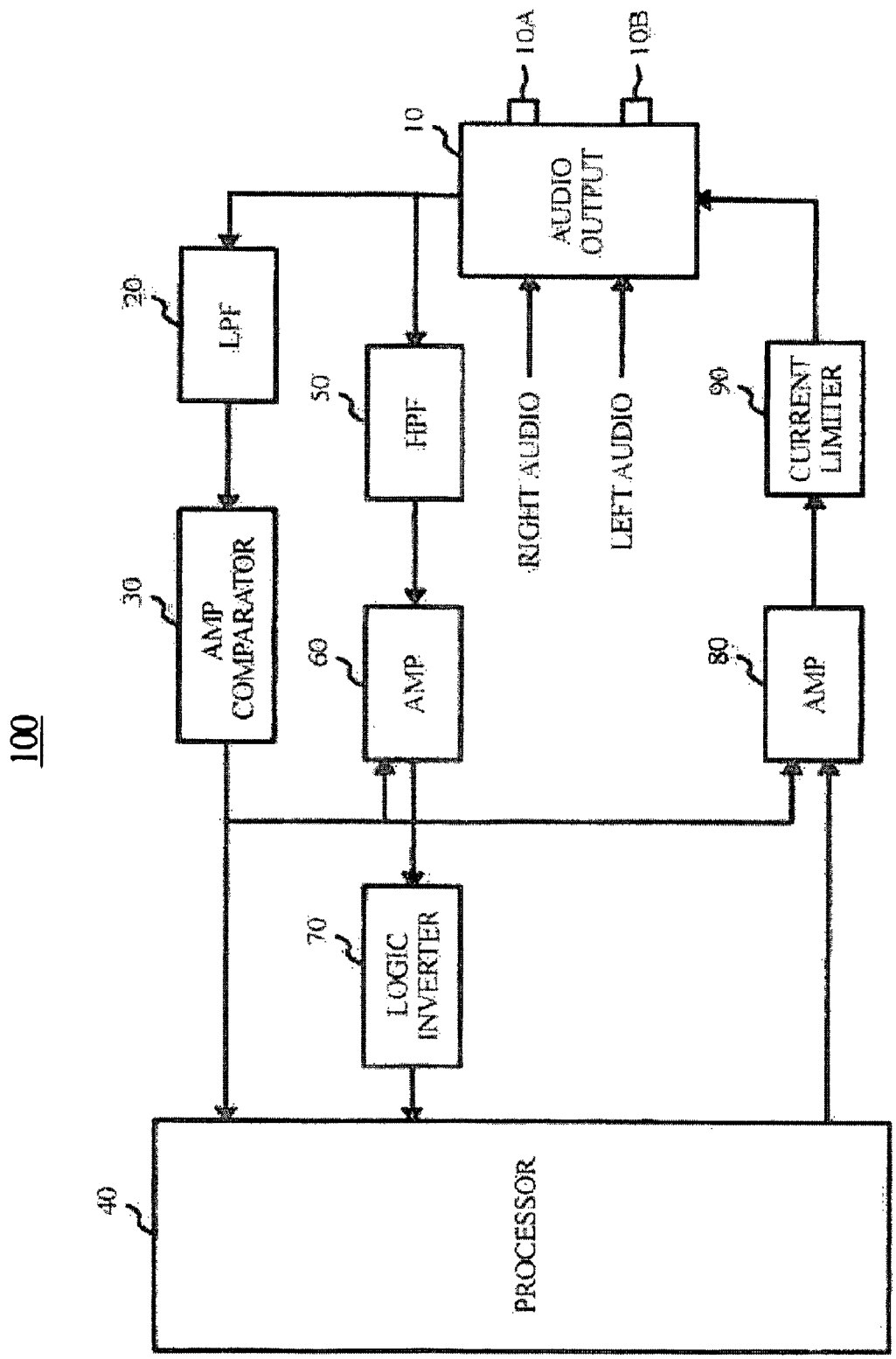
FIG. 2 is a block diagram providing further exemplary details of the apparatus of FIG. 1.

Referring to FIG. 2, a block diagram illustrating further exemplary details of apparatus 100 of FIG. 1 is shown. As shown in FIG. 2, apparatus 100 comprises output means such as audio output terminal 10, low pass filtering means such as low pass filter 20, amplifying and comparing means such as amplifier/comparator 30, processing means such as processor 40, high pass filtering means such as high pass filter (HPF) 50, second amplifying means such as amplifier 60, logic inverting means such as logic inverter 70, third amplifying means such as amplifier 80, and current limiting means such as current limiter 90. The foregoing elements of apparatus 100 may for example be embodied using one or more integrated circuits (ICs). Further exemplary details of the elements of FIG. 2 are provided in FIG. 3. Accordingly, the elements of FIG. 2 will now be described with reference to FIGS. 2 and 3.

Figure 3:
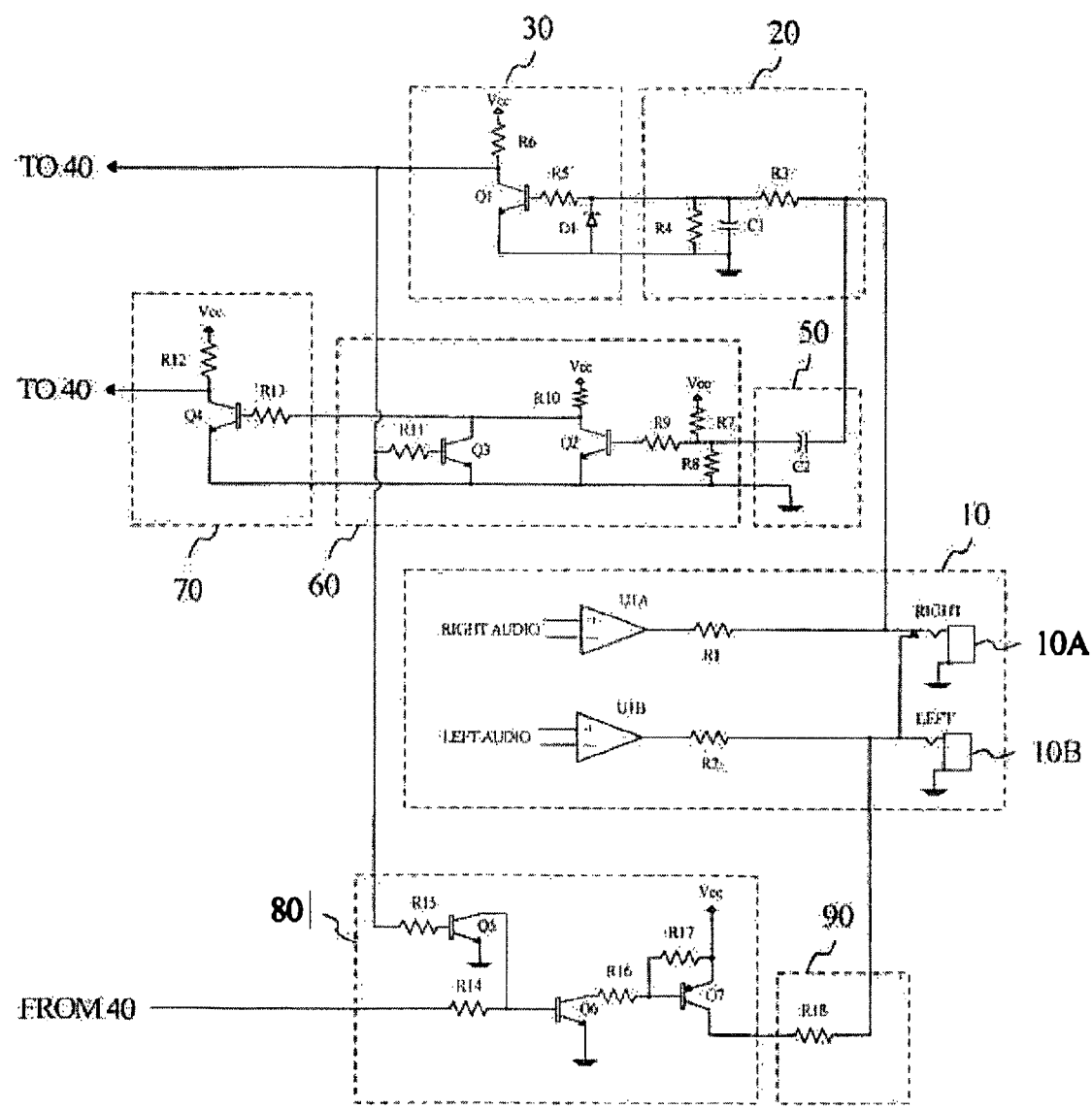
FIG. 3 is a schematic diagram providing further exemplary details of the elements of FIG. 2.

Audio output terminal 10 is operative to enable an audio output function and a diagnostic function of apparatus 100. As shown in FIG. 3, audio output terminal 10 comprises output amplifiers U1A and U1B, resistors R1 and R2, and first and second terminals 10A and 10B. As previously indicated herein, first and second terminals 10A and 10B represent audio output jacks of apparatus 100 that are used to output audio signals during the first mode of operation (i.e., normal mode), and to provide a diagnostic function of apparatus 100 during the second mode of operation (i.e., diagnostic mode).

According to an exemplary embodiment, output amplifiers U1A and U1B of audio output terminal 10 receive right and left differential audio signals from audio processing circuitry (not shown in FIGS.), and amplify the received audio signals to provide right and left audio output signals via first and second terminals 10A and 10B, respectively. Also, according to an exemplary embodiment, the maximum signal level of the right and left audio output signals is 2 Vrms, or about +2.83V peak to −2.83V peak. Output amplifiers U1A and U1B are protected against short-circuit by series resistors R1 and R2. Preferred values for resistors R1 and R2 are 1 kΩ each, although other values may be used. Although not expressly shown in FIG. 3, a small value capacitor (e.g., 50 to 1000 pF) may be added across each audio output line to reduce radio frequency (RF) radiation (e.g., EMI) from audio cables connected to apparatus 100 via first and second terminals 10A and 10B.

LPF 20 is operative to perform a low pass filtering function of apparatus 100. As shown in FIG. 3, LPF 20 comprises capacitor C1 and resistors R3 and R4. Preferred values for capacitor C1 and resistors R3 and R4 are 10 pF, 470 kΩ, and 100 kΩ, respectively, although other values may be used. According to an exemplary embodiment, LPF 20 is used to reject signal variations due to the presence of an audio signal on the right audio output line of audio output terminal 10 during the first mode of operation (i.e., normal mode). As will be described later herein, the voltage dividing effect of resistors R3 and R4 determines the sensitivity for detecting a control signal which switches apparatus 100 from the first mode (i.e., normal mode) to the second mode (i.e., diagnostic mode), and vice-versa.

Amplifier/comparator 30 is operative to perform amplifying and comparing functions of apparatus 100. As shown in FIG. 3, amplifier/comparator 30 comprises npn-type transistor Q1, resistors R5 and R6, and diode D1. The preferred value for resistor R5 is 47 kΩ, while resistor R6 may have a value ranging from 1 kΩ to 10 kΩ. Other values may also be used for resistors R5 and R6. According to an exemplary embodiment, transistor Q1 remains turned off in the presence of an audio signal on the right audio output line of audio output terminal 10 due to the filtering function of LPF 20, but will turn on in the presence of a control signal having sufficient direct current (DC) voltage on the right audio output line of audio output terminal 10.

According to an exemplary embodiment, a control signal may be applied to apparatus 100 by an external device (e.g., dongle board) via first terminal 10A of audio output terminal 10 to thereby switch apparatus 100 from the first mode (i.e., normal mode) to the second mode (i.e., diagnostic mode). When the control signal is applied to apparatus 100 via first terminal 10A, it is filtered by LPF 20 and provided to transistor Q1 through current limiting resistor R5. Transistor Q1 operates as a comparator and will pull the voltage on its collector low (e.g., near ground) when the control signal of sufficient DC voltage is applied to apparatus 100 via first terminal 10A. The control signal applied to apparatus 100 by the external device via first terminal 10A that causes apparatus 100 to switch from the first mode (i.e., normal mode) to the second mode (i.e., diagnostic mode) may be referred to herein as a "first diagnostic signal" or a "DC super voltage" since its DC voltage level exceeds the peak voltage present on first terminal 10A during the first mode (i.e., normal mode) when audio signals are being output from apparatus 100. According to an exemplary embodiment, apparatus 100 remains in the second mode (i.e., diagnostic mode) for as long as this control signal (i.e., first diagnostic signal/DC super voltage) exhibits sufficient DC voltage.

Also, according to an exemplary embodiment, the voltage dividing effect of resistors R3 and R4 of LPF 20 determines the sensitivity for detecting the control signal that causes apparatus 100 to switch from the first mode (i.e., normal mode) to the second mode (i.e., diagnostic mode), and vice-versa. Simulation using resistor R3 equal to 470 kΩ and resistor R4 equal to 100 kΩ shows a threshold of about +5 VDC for the control signal. Accordingly, if the DC voltage level present on first terminal 10A of audio output terminal 10 is less than 4V, then transistor Q1 will remain off (i.e., normal mode), and if the DC voltage level present on first terminal 10A is greater than 5.5V, then transistor Q1 will be turned on (i.e., diagnostic mode) with the control signal output from its collector at a voltage level below 0.46 VDC. Diode D1 serves to protect transistor Q1 against negative voltage inputs to first terminal 10A. Also, according to an exemplary embodiment, resistor R6 acts as a pull-up resistor to produce the control signal for processor 40 in a logic high state when transistor Q1 is turned off (i.e. normal mode). The voltage level used for Vcc in FIG. 3 should be compatible with the logic levels used by processor 40. For example, a voltage level of 3.3V may be used for Vcc according to an exemplary embodiment.

Processor 40 is operative to perform various processing functions of apparatus 100. As shown in FIGS. 2 and 3, processor 40 receives the control signal from the collector of transistor Q1 of amplifier/comparator 30 and switches apparatus 100 from the first mode (i.e., normal mode) to the second mode (i.e., diagnostic mode), or vice-versa, responsive to this control signal. As previously indicated herein, the control signal from transistor Q1 is in a logic high state during the first mode (i.e., normal mode), and is in a logic low state during the second mode (i.e., diagnostic mode). According to an exemplary embodiment, processor 40 provides a control signal to audio processing circuitry (not shown in FIGS.) of apparatus 100 that enables audio outputs via audio output terminal 10 during the first mode (i.e., normal mode), and disables those audio outputs during the second mode (i.e., diagnostic mode).

Also according to an exemplary embodiment, processor 40 is operative to receive a digital diagnostic signal from a receiving (RX) channel of apparatus 100 including first terminal 10A, HPF 50, amplifier 60, and logic inverter 70 during the second mode (i.e., diagnostic mode). The digital diagnostic signal received by processor 40 via this RX channel may be provided to apparatus 100 from an external device, and may for example represent a request for certain diagnostic information related to apparatus 100. During the first mode (i.e., normal mode), processor 40 is operative to either disable its receiving function for signals received via the RX channel, or to ignore any signals received thereon.

According to an exemplary embodiment, processor 40 is also operative to provide digital diagnostic information to the external device via a transmitting (TX) channel of apparatus 100 including amplifier 80, current limiter 90, and second terminal 10B during the second mode (i.e., diagnostic mode). This digital diagnostic information provided to the external device during the second mode (i.e., diagnostic mode) may be referred to herein as a "second diagnostic signal." During the first mode (i.e., normal mode), processor 40 is operative to disable its transmitting function for the TX channel.

HPF 50 is operative to perform a high pass filtering function of apparatus 100. As shown in FIG. 3, HPF 50 comprises a capacitor C2 which high pass filters signals provided from first terminal 10A of audio output terminal 10. The preferred value for capacitor C2 is 100 nF, although other values may be used. According to an exemplary embodiment, HPF 50 is part of the RX channel of apparatus 100 that receives a digital diagnostic signal provided from an external device via first terminal 10A during the second mode (i.e., diagnostic mode). As previously indicated herein, the digital diagnostic signal received by HPF 50 may for example represent a request for certain diagnostic information related to apparatus 100. This digital diagnostic signal is separated in frequency from the control signal (i.e., first diagnostic signal or DC super voltage) that causes apparatus 100 to be in the second mode (i.e., diagnostic mode), and may therefore be isolated and received by HPF 50.

Amplifier 60 is operative to perform an amplifying function of apparatus 100. As shown in FIG. 3, amplifier 60 comprises npn-type transistors Q2 and Q3, and resistors R7 to R11. Preferred values for resistors R7 to R11 are 47 k$\Omega$, 100 k$\Omega$, 47 k$\Omega$, 10 k$\Omega$, and 47 k$\Omega$, respectively, although other values may be used. According to an exemplary embodiment, amplifier 60 is also part of the RX channel of apparatus 100, and receives and amplifies the digital diagnostic signal provided from an external device via first terminal 10A and HPF 50 during the second mode (i.e., diagnostic mode). Also, according to an exemplary embodiment, transistor Q3 is turned off during the second mode (i.e., diagnostic mode), and thereby enables the digital diagnostic signal to be received.

Logic inverter 70 is operative to perform a logic inverting function of apparatus 100. As shown in FIG. 3, logic inverter 70 comprises an npn-type transistor Q4, and resistors R12 and R13. Preferred values for resistors R12 and R13 are 10 k$\Omega$ and 47 k$\Omega$, respectively, although other values may be used. According to an exemplary embodiment, logic inverter 70 is also part of the RX channel of apparatus 100, and inverts the logic state of the digital diagnostic signal provided from an external device via first terminal 10A, HPF 50 and amplifier 60 during the second mode (i.e., diagnostic mode). As indicated in FIGS. 2 and 3, the inverted digital signal from logic inverter 70 is provided to processor 40 for processing.

Amplifier 80 is operative to perform an amplifying function of apparatus 100. As shown in FIG. 3, amplifier 80 comprises npn-type transistors Q5 and Q6, pnp-type transistor Q7, and resistors R14 to R17. Preferred values for resistors R14 to R17 are 47 k$\Omega$ each, although other values may be used. According to an exemplary embodiment, amplifier 80 is part of the TX channel of apparatus 100 that provides digital diagnostic information (i.e., second diagnostic signal) to an external device via second terminal 10B during the second mode (i.e., diagnostic mode). Also, according to an exemplary embodiment, transistor Q5 is turned off during the second mode (i.e., diagnostic mode). This enables transistors Q6 and Q7 to drive current towards current limiter 90, and thereby allows digital diagnostic information (i.e., second diagnostic signal) from processor 40 to be amplified and output via second terminal 10B. Conversely, transistor Q5 is turned on during the first mode (i.e., normal mode). This action clamps the base of transistor Q6 at ground and effectively turns off transistor Q7. It is noted that the voltage level used for Vcc at the emitter of transistor Q7 must be greater than the highest peak audio output voltage present on second terminal 10B to avoid creating current flow through the collector-base junction of transistor Q7 were that collector-base junction to become forward biased. According to an exemplary embodiment, a voltage level of 3.3V may be used for Vcc at the collector of transistor Q7, although a voltage level of 5V may produce even better results.

Current limiter 90 is operative to perform a current limiting function of apparatus 100. As shown in FIG. 3, current limiter 90 comprises a resistor R18. The preferred value for R18 is 470$\Omega$, although other values may be used. According to an exemplary embodiment, current limiter 90 is also part of the TX channel of apparatus 100 and limits the output current of amplifier 80.

It is noted that there may be numerous variations of apparatus 100 according to the present invention. For example, apparatus 100 has been described herein such that the right audio output jack (i.e., first terminal 10A) is used to receive the control signal (i.e., first diagnostic signal) from an external device that activates the second mode (i.e., diagnostic mode). However, this designation may be reversed such that the left audio output jack (i.e., terminal 10B) of apparatus 100 operates in the manner as the right audio output jack (i.e., terminal 10A), as described herein. This reversal would of course require the disclosed circuitry of apparatus 100 to also be reversed accordingly. It is also noted that the use of video terminals/jacks for obtaining diagnostic information is generally not preferred according to the present invention since this may disrupt the video display for which diagnostic information is being sought. Other non-dedicated terminals of apparatus 100, however, may be used according to the present invention. It is further noted that the full duplex implementation of apparatus 100 as disclosed herein could be simplified. For example, a simpler design of apparatus 100, which is only capable of sending outbound diagnostic information, could also be used. This type of implementation would not require HPF 50, amplifier 60, or logic inverter 70 of the RX channel of apparatus 100. Other variations of apparatus 100 could also be used according to the present invention.

Figure 4:
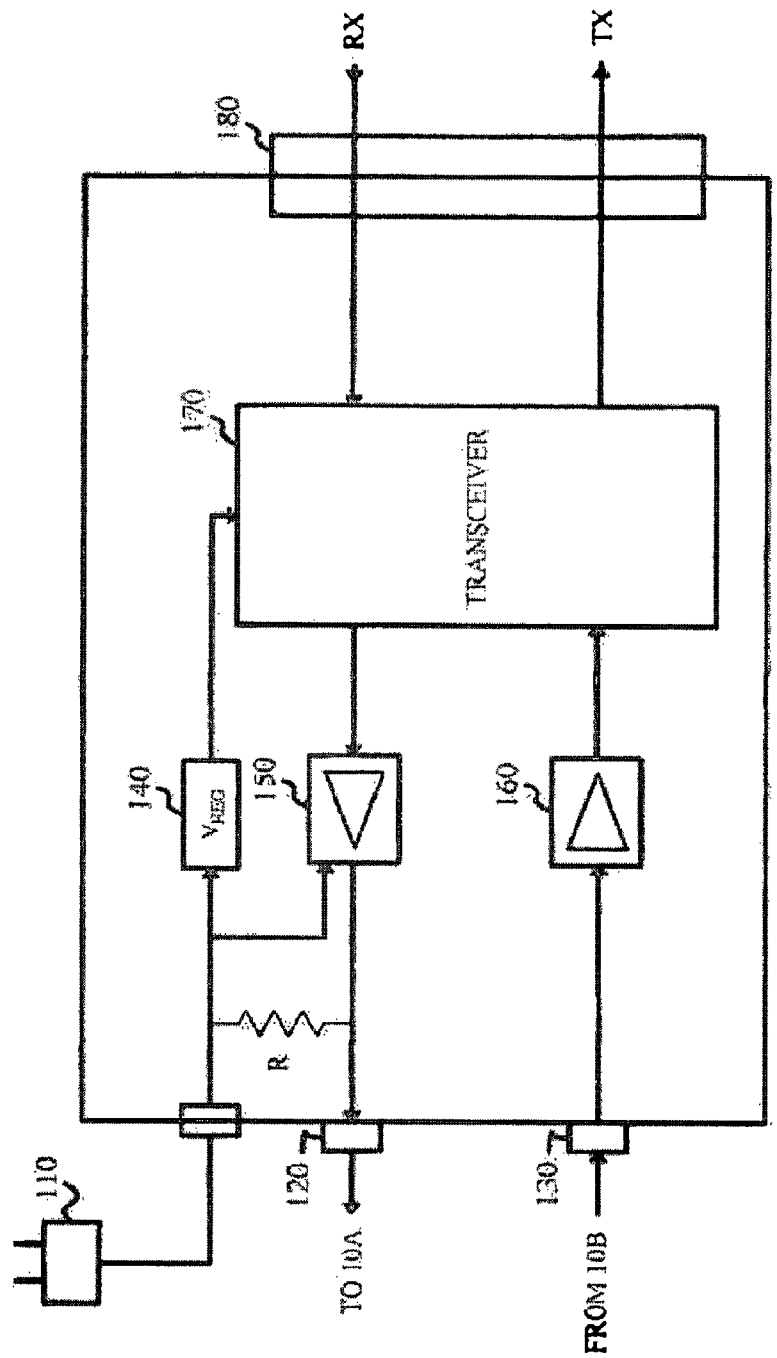
FIG. 4 is a block diagram of an external device connectible to the apparatus of FIG. 1 for providing a diagnostic function.

Referring to FIG. 4, a block diagram of an external device 200 connectible to apparatus 100 of FIGS. 1 to 3 for providing a diagnostic function is shown. As shown in FIG. 4, external device 200 comprises power supply means such as power supply 110, first and second terminal means such as first and second terminals 120 and 130, voltage regulating means such as voltage regulator 140, first amplifying means such as amplifier 150, second amplifying means such as amplifier 160, transmitting/receiving means such as transceiver 170, and third terminal means such as third terminal 180. Some of the foregoing elements of external device 200 may for example be embodied using one or more ICs. According to an exemplary embodiment, external device 200 may represent a dongle board or other type of diagnostic equipment.

Power supply 110 is operative to provide electrical power to external device 200. According to an exemplary embodiment, power supply 110 may be plugged into a conventional wall outlet and converts a received alternating current (AC) voltage signal to an input DC voltage signal of 9V to 12V for external device 200. The input voltage signal from power supply 110 is also applied to resistor R to produce the control signal (i.e., first diagnostic signal) that causes apparatus 100 to be in the second mode (i.e., diagnostic mode). As indicated in FIG. 4, the control signal (i.e., first diagnostic signal) is provided to first terminal 10A of apparatus 100 via first terminal 120. The preferred value for resistor R of external device 200 is between 560$\Omega$ and 1 k$\Omega$, although other values may be used.

First and second terminals 120 and 130 are operative to connect external device 200 to another device or apparatus, such as apparatus 100. According to an exemplary embodiment, first and second terminals 120 and 130 of external device 200 connect to first and second terminals 10A and 10B of apparatus 100, respectively, via cables or other medium to enable the diagnostic function of apparatus 100.

Voltage regulator 140 is operative to perform a voltage regulation function of external device 200. According to an exemplary embodiment, voltage regulator 140 converts input voltage signal provided from power supply 110 to a voltage signal that is useable by transceiver 170.

Amplifier 150 is operative to perform an amplifying function of external device 200. According to an exemplary embodiment, amplifier 150 is operative to shift the level of the digital diagnostic signal (e.g., diagnostic request signal) provided to the RX channel of apparatus 100 during the second mode (i.e., diagnostic mode), as previously described herein. As indicated in FIG. 4, amplifier 150 receives the input voltage signal from power supply 110, and provides the digital diagnostic information to apparatus 100 via first terminals 10A and 120.

Amplifier 160 is operative to perform an amplifying function of external device 200. According to an exemplary embodiment, amplifier 160 is operative to shift the level of the digital diagnostic information (i.e., second diagnostic signal) provided from the TX channel of apparatus 100 during the second mode (i.e., diagnostic mode), as previously described herein. As indicated in FIG. 4, amplifier 160 receives the digital diagnostic information (i.e., second diagnostic signal) from apparatus 100 via second terminals 10B and 130.

Transceiver 170 is operative to perform a signal transmitting and receiving function of external device 200. According to an exemplary embodiment, transceiver 170 is operative to enable RS-232 format or other signals to be received from and provided to another device or apparatus, such as a computer (not shown in FIGS.) that generates the digital diagnostic signal (e.g., diagnostic request signal) provided to the RX channel of apparatus 100, and receives and processes the digital diagnostic information provided from the TX channel of apparatus 100.

Third terminal 180 is operative to connect external device 200 via cable or other medium to another device or apparatus, such as a computer (not shown in FIGS.) that generates the digital diagnostic signal (e.g., diagnostic request signal) provided to the RX channel of apparatus 100, and receives and processes the digital diagnostic information provided from the TX channel of apparatus 100. According to an exemplary embodiment, third terminal 180 may for example be embodied as connector (e.g., 9-pin D-type connector) capable of being coupled to an RS-232 serial port of a computer.

Figure 5:
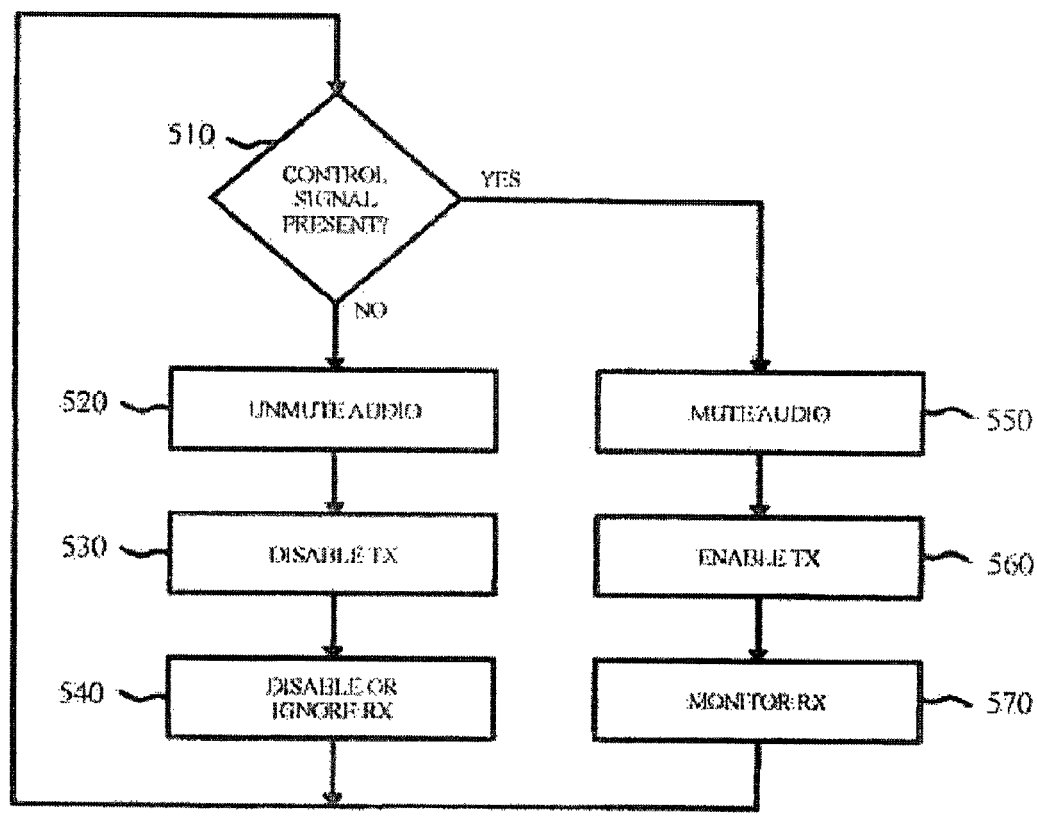
FIG. 5 is a flowchart illustrating steps according to an exemplary embodiment of the present invention.

To facilitate a better understanding of the present invention, an example will now be provided. Referring to FIG. 5, a flowchart 500 illustrating steps according to an exemplary embodiment of the present invention is shown. For purposes of example and explanation, the steps of FIG. 5 will be described with reference to apparatus 100. The steps of FIG. 5 are exemplary only, and are not intended to limit the present invention in any manner.

At step 510, a determination is made as to whether the control signal for activating the second mode (i.e., diagnostic mode) of apparatus 100 is present. According to an exemplary embodiment, processor 40 is programmed to make the determination at step 510 based on the logic state of the control signal provided from the collector of transistor Q1 (see FIG. 3). As previously indicated herein, the control signal from transistor Q1 is in a logic high state during the first mode (i.e., normal mode), and is in a logic low state during the second mode (i.e., diagnostic mode). Accordingly, processor 40 detects activation of the second mode (i.e., diagnostic mode) when the control signal from transistor Q1 is in a logic low state.

If the determination at step 510 is negative, process flow advances to step 520 where the audio outputs of apparatus 100 are unmuted (i.e., enabled). In other words, step 520 is part of the first mode (i.e., normal mode) during which apparatus 100 provides audio outputs via first and second terminals 10A and 10B of audio output terminal 10 in a normal manner. If apparatus 100 was previously in the second mode (i.e., diagnostic mode), then processor 40 provides a control signal to audio processing circuitry (not shown in FIGS.) of apparatus 100 at step 520 that enables its audio outputs.

At step 530, the TX channel of apparatus 100 is disabled. According to an exemplary embodiment, processor 40 disables its transmitting function for the TX channel of apparatus 100 (i.e., amplifier 80, current limiter 90, and second terminal 10B) to ensure that apparatus 100 can properly provide audio outputs during the first mode (i.e., normal mode).

At step 540, the RX channel of apparatus 100 is disabled, or any signals received thereon are ignored. According to an exemplary embodiment, processor 40 either disables its receiving function for signals received via the RX channel (i.e., first terminal 10A, HPF 50, amplifier 60, and logic inverter 70), or ignores any signals received thereon, at step 540. Step 540 is of course also part of the first mode (i.e., normal mode). From step 540, process flow loops back to step 510.

If the determination at step 510 is positive, process flow advances to step 550 where the audio outputs of apparatus 100 are muted (i.e., disabled). In other words, step 550 is part of the second mode (i.e., diagnostic mode) during which apparatus 100 provides digital diagnostic information (i.e., second diagnostic signal) to external device 200 via second terminal 10B. If apparatus 100 was previously in the first mode (i.e., normal mode), then processor 40 provides a control signal to audio processing circuitry (not shown in FIGS.) of apparatus 100 at step 550 that disables its audio outputs.

At step 560, the TX channel of apparatus 100 is enabled. According to an exemplary embodiment, processor 40 enables its transmitting function for the TX channel of apparatus 100 (i.e., amplifier 80, current limiter 90, and second terminal 10B) to ensure that apparatus 100 can properly provide digital diagnostic information (i.e., second diagnostic signal) to external device 200 during the second mode (i.e., diagnostic mode).

At step 570, the RX channel of apparatus 100 is monitored. According to an exemplary embodiment, processor 40 enables its receiving function for signals provided via the RX channel (i.e., first terminal 10A, HPF 50, amplifier 60, and logic inverter 70), and monitors the RX channel for any digital diagnostic signals (e.g., diagnostic request signals) from external device 200, at step 570. Processor 40 also provides any digital diagnostic information responsive to any digital diagnostic signals provided via the RX channel. From step 570, process flow loops back to step 510.

As described herein, the present invention provides a terminal sharing arrangement that enables output terminals of an apparatus to be used for both outputting signals and providing a diagnostic function. The present invention may be applicable to various apparatuses, either with or without an integrated display device. Accordingly, the terms "apparatus" or "television signal receiver" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An apparatus, comprising:
a first terminal for outputting a first output signal during a first mode, and for direct interfacing with and receiving a first diagnostic signal from an external source during a second mode;
a second terminal for outputting a second output signal during said first mode, and for outputting a second diagnostic signal during said second mode; and
a circuit for detecting said first diagnostic signal at the first terminal; and
wherein when said circuit detects that said first terminal receives said first diagnostic signal from an external device, said circuit causes said apparatus to be in said second mode.

2. The apparatus of claim 1, wherein:
said first terminal is a right audio output jack; and
said second terminal is a left audio output jack.

3. The apparatus of claim 1, wherein:
said first terminal is a left audio output jack; and
said second terminal is a right audio output jack.

4. The apparatus of claim 1, wherein said first and second output signals include audio signals.

5. The apparatus of claim 1, further comprising a processor configured to inhibit said first and second output signals responsive to said first diagnostic signal.

6. A method for providing a diagnostic function of an apparatus, comprising:
using a first terminal of said apparatus to output a first output signal during a first mode, and to directly interface with and receive a first diagnostic signal from an external source during a second mode;
using a second terminal of said apparatus to output a second output signal during said first mode, and to output a second diagnostic signal during said second mode; and
using a circuit to detect said first diagnostic signal at the first terminal; and
wherein when said circuit detects that said first terminal receives said first diagnostic signal from an external device, said circuit causes said apparatus to be in said second mode.

7. The method of claim 6, wherein:
said first terminal is a right audio output jack; and
said second terminal is a left audio output jack.

8. The method of claim 6, wherein:
said first terminal is a left audio output jack; and
said second terminal is a right audio output jack.

9. The method of claim 6, wherein said first and second output signals include audio signals.

10. The method of claim 6, wherein said first diagnostic signal causes the output of said first and second output signals to be inhibited.

11. A television signal receiver, comprising:
a first terminal operative to output a first output signal during a first mode, and to directly interface with and receive a first diagnostic signal from an external source during a second mode;
a second terminal operative to output a second output signal during said first mode, and to output a second diagnostic signal during said second mode; and
a circuit for detecting said first diagnostic signal at the first terminal; and
wherein when said circuit detects that said first terminal receives said first diagnostic signal from an external device, said circuit causes said television signal receiver to be in said second mode.

12. The television signal receiver of claim 11, wherein:
said first terminal is a right audio output jack; and
said second terminal is a left audio output jack.

13. The television signal receiver of claim 11, wherein:
said first terminal is a left audio output jack; and
said second terminal is a right audio output jack.

14. The television signal receiver of claim 11, wherein said first and second output signals include audio signals.

15. The television signal receiver of claim 11, further comprising a processor operative to inhibit said first and second output signals responsive to said first diagnostic signal.

* * * * *